(12) United States Patent
Steenhof et al.

(10) Patent No.: US 6,418,270 B1
(45) Date of Patent: Jul. 9, 2002

(54) APPARATUS AND METHOD FOR RECORDING A DIGITAL INFORMATION SIGNAL IN SLANT TRACKS ON A RECORD CARRIER

(75) Inventors: Frits A. Steenhof; Albert M. A. Rijckaert, both of Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/451,278

(22) Filed: Nov. 30, 1999

(30) Foreign Application Priority Data

Dec. 2, 1998 (EP) .............................. 98204069

(51) Int. Cl.[7] .................................. H04N 5/91
(52) U.S. Cl. .............................. 386/81; 386/68; 360/48
(58) Field of Search ........................... 386/6–8, 21, 37, 386/40, 68, 33, 81–82, 113, 116, 124; 360/32, 40, 48; H04N 5/91

(56) References Cited

U.S. PATENT DOCUMENTS

| | | | | |
|---|---|---|---|---|
| 5,546,244 A | * | 8/1996 | Park et al. | 386/124 |
| 5,579,183 A | * | 11/1996 | Van Gestel et al. | 360/48 |
| 5,729,647 A | * | 3/1998 | Kim | 386/46 |
| 5,953,483 A | * | 9/1999 | Van Gestel et al. | 386/65 |
| 6,097,877 A | * | 8/2000 | Katayama et al. | 386/68 |
| 6,141,485 A | * | 10/2000 | Shinohaara et al. | 386/68 |
| 6,141,486 A | * | 10/2000 | Lane et al. | 386/68 |
| 6,222,981 B1 | * | 4/2001 | Rijckaert | 368/68 |

FOREIGN PATENT DOCUMENTS

WO        WO 98/34226       *  8/1998       ......... H04N/5/7826

* cited by examiner

*Primary Examiner*—Vincent Boccio
(74) *Attorney, Agent, or Firm*—Edward W. Goodman

(57) ABSTRACT

A signal processing technique for generating and processing trick play information for recording on a record carrier is used in an apparatus for recording a digital information signal onto a record carrier, in which the apparatus includes a first error correction encoder for error correcting trick play sync blocks generated from the digital information signal, a second error correction encoder for error correcting sync blocks formed from sync blocks of the digital information signal and the error corrected trick play sync blocks, and a third error correction encoder for error correcting each of the error corrected sync blocks. In the technique, the order that the trick play sync blocks provided by the first error correction encoder to the second error correction encoder is not the same as the order in which the third error correction encoder supplies the trick play sync blocks to the writing heads.

2 Claims, 1 Drawing Sheet

APPARATUS AND METHOD FOR RECORDING A DIGITAL INFORMATION SIGNAL IN SLANT TRACKS ON A RECORD CARRIER

BACKGROUND OF THE INVENTION

1. Field of the Invention

The invention relates to an apparatus for recording a digital information signal in slant tracks on a record carrier, the apparatus comprising input means for receiving the digital information signal, first coding means for encoding the digital information signal so as to obtain sync blocks of information comprising a portion of information of the digital information signal, trick play signal receiving means for receiving a trick play signal, second coding means for encoding the trick play signal so as to obtain trick play sync blocks of information comprising a portion of the trick play signal, first error correction encoding means for carrying out an error correction encoding step on N trick play sync blocks of the trick play signal so as to obtain M trick play sync blocks comprising parity information, generation means for generating groups of P sync blocks, a group of P sync blocks comprising sync blocks of the digital information signal and at least some of the N+M trick play sync blocks, second error correction encoding means for carrying out a second error correction encoding step on a group of P sync blocks so as to obtain a group of P+Q sync blocks, third error correction encoding means for carrying out an error correction encoding step on each sync block in the group of P+Q sync blocks so as to obtain a group of P+Q error correction encoded sync blocks, and writing means for writing P+Q error correction encoded sync blocks in a plurality of R tracks on the record carrier, where M, N, P, Q and R are integers larger than 1.

The invention further relates to a method for recording the digital information signal.

2. Description of the Related Art

Such an apparatus is known from International Patent Application WO 98/34226, corresponding to U.S. Pat. No. 6,222,981, document D1 in the list of related documents. This document describes how a trick play signal has been derived, preferably from the video information signal received, in which the trick play signal and the video information signal are processed and combined into a composite information signal and recorded on the record carrier. The processing of the trick play signal and the video information signal into the composite signal requires an incorporation into a hardware solution, or a software solution, which is sometimes hard to realize.

SUMMARY OF THE INVENTION

The invention aims at providing an improved apparatus, which makes the incorporation into a hardware or software solution better realizable. In accordance with the invention, the apparatus is characterized in that the order in which the trick play sync blocks are supplied by the first error correction encoding means to the second error correction encoding means is not the same as the order in which the third error correction encoding means supply said trick play sync blocks after error correction encoding to the writing means.

The invention is based on the recognition that, by enabling a freedom in the order in which the trick play sync blocks are supplied to the second. error correction encoding means, this offers the engineer that has to provide an IC version of the signal processing possibilities to simplify the processing and/or make use of idle portions of the processing circuitry, so that a better and optimalized IC embodiment can be realized.

BRIEF DESCRIPTION OF THE DRAWINGS

These and other aspects of the invention will be described hereafter in the figure description, in which.

DESCRIPTION OF THE PREFERRED EMBODIMENTS

Figure 1:
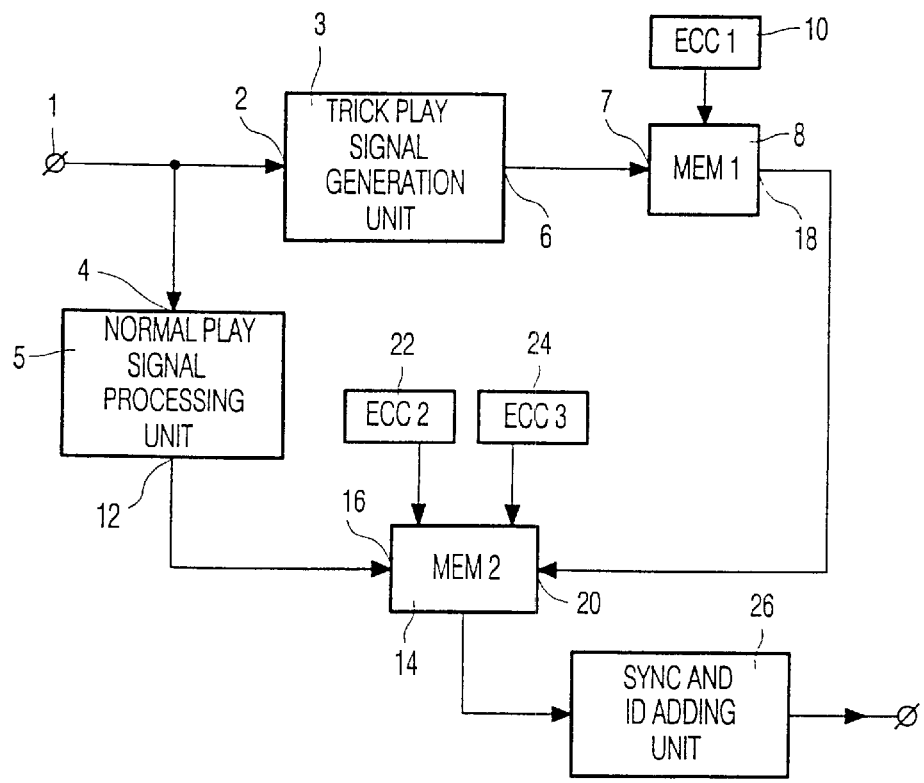
FIG. 1 shows the apparatus in accordance with the invention.

The apparatus comprises an input terminal 1 for receiving the input information signal, which may be an MPEG/encoded, video information signal, encoded into MPEG packets of information, with corresponding MPEG packets comprising audio information corresponding to the video signal. The input terminal 1 is coupled to an input 2 of a trick play signal generation unit 3, as well as to an input 4 of a normal play signal processing unit 5. The trick play signal generation unit 3 derives the trick play signal from the incoming video information signal, e.g., such as described in earlier filed European Patent Application No. 98201959.8, corresponding to U.S. patent application Ser. No. 09/329, 394, filed Jun. 10, 1999, document D2 in the List Of Related Documents. This results in packets of MPEG/encoded information of the trick play signal, provided with a time stamp each, these packets being included in so-called trick play sync blocks (one packet in two subsequent trick play sync blocks) and supplied to an output 6. The normal play signal processing unit 5 processes the packets of the input information signal by adding time stamps to each of the packets and storing the packets in sync blocks, again one packet in two subsequent sync blocks).

The sync blocks for the input information signal and the trick play sync blocks for the trick play signal have the form as disclosed in document D1, FIG. 10, however, without the two sync bytes, the three ID bytes and the eight parity bytes shown therein, because they are added later to the sync blocks, as will be made clear below.

It is assumed here that only one trick play signal, for only one trick play speed, is generated in the unit 3. It may, of course, be possible to generate more than one trick play signal, for other trick play speeds. It will be understood that, in such situation, the other one or more trick play signals will be processed in the same way.

Figure 2:
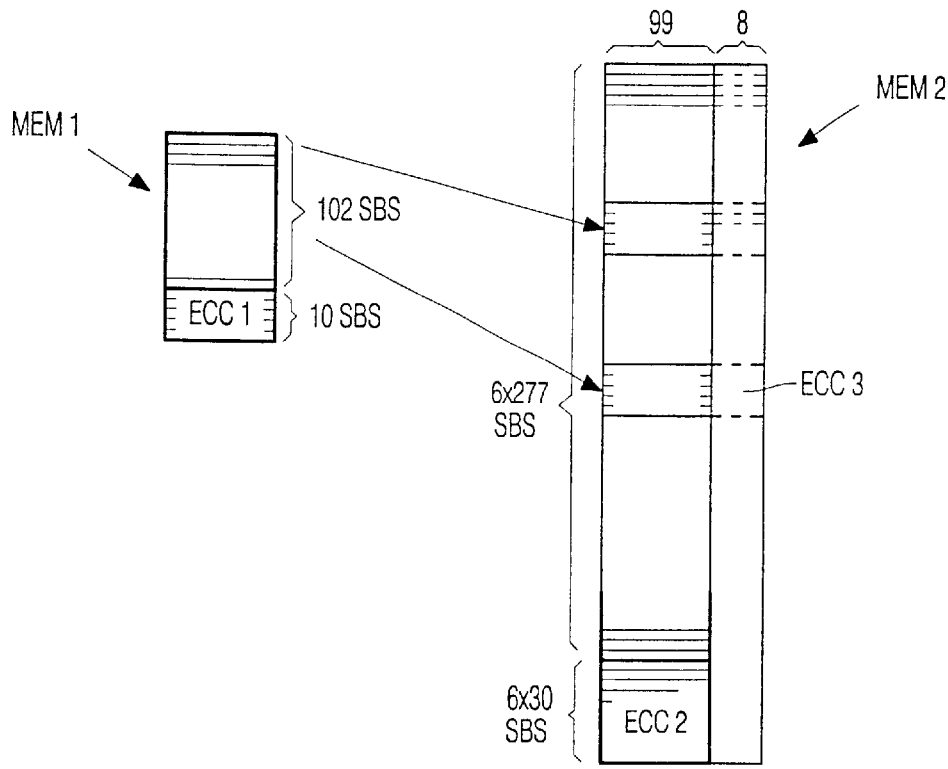
FIG. 2 shows the signal processing in the first and second error correction encoding means carried out on the sync blocks.

The output 6 of the trick play signal generation unit 3 is coupled to an input 7 of a memory unit 8, denoted MEM1. Each time, 102 trick play sync blocks of the trick play signal supplied by the unit 3 are stored in the memory unit 8. This is schematically shown in FIG. 2 by MEM1. A so-called 'vertical' or 'outer' error correction encoding ECC1 is carried out on the 102 trick play sync blocks of an individual trick play signal in the memory unit 8, so as to generate 10 trick play sync blocks of parity information. This is schematically shown in FIG. 1 by means of the processing unit 10, which realizes the error correction encoding step ECC1 on the information stored in the memory 8, as well as by the 10 added trick play sync blocks comprising the parity information in the left hand side of FIG. 2. It should be noted that the block shown in the left hand side of FIG. 2 and denoted MEM1, is not actually the contents and the size of the memory unit 8, but, more specifically, gives an indication of the ECC1 processing on 102 trick play sync blocks. The actual size of the memory unit 8 will generally be equal to at least the amount of trick play sync blocks that should be stored in the trick play segments in the six tracks that form an ECC block of information.

The output 12 of the unit 5 is coupled to an input 16 of a memory unit 14. Further, an output 18 of the memory unit 8 is coupled to an input 20 of the memory unit 14, also denoted MEM2.

The memory unit 14 is capable of receiving so many sync blocks that 6 tracks on the record carrier can be filled with data. Those 6 tracks of information form an ECC block of information. From International Patent Application WO 98/34,226 (PHN 16,614), it is known that one track comprises 336 sync blocks of information. Only 307 sync blocks, namely, the sync blocks numbered 29 to 335 in each track in FIG. 1 of WO 98/34,226, are the sync blocks that will be discussed further.

The memory unit 14 has sufficient memory space to store 6×307=1842 sync blocks of information. The memory unit 14 is filled with sync blocks of the incoming input information signal supplied by the unit 5 and with trick play sync blocks supplied by the memory unit 8. Actually, only 6×277 sync blocks from the units 5 and 8 are stored in the memory unit 14, for the reason that the last 30 sync blocks in each track, the sync blocks numbered 306 to 335, see FIG. 1 in WO 98/34,226, are sync blocks comprising parity information and will be derived in an error correction encoding step to be described later.

The unit 5 supplies such an amount of sync blocks of the normal play data to the memory unit 14 as required for recording in those 6 tracks that form the error correction block of information. More specifically, the unit 5 supplies sync blocks that will in the end, be recorded in one of the sync block positions numbered 29 to 305, inclusive, in those 6 tracks, so long as such position is not restricted for the storage of the trick play data. The memory unit 8 supplies as many trick play sync blocks as needed to fill the trick play segments for the one or more trick play signals, that are present in the 6 track error correction block. This amount of trick play sync blocks can include the repetitions, all extensively described in WO 98/34,226. The contents of the memory unit 14 is schematically shown at the right hand side of FIG. 2.

In fact, the memory unit 14 is filled with 6×277 sync blocks of 99 bytes long. Next, a second error correction encoding is carried out on the sync blocks in the memory unit 14. This second error correction encoding step is realized under the influence of the control block 22, denoted ECC2, in FIG. 1. The second error correction encoding step is, again, a so-called 'vertical' or 'outer' error correction encoding, carried out on the 6×277 sync blocks in the memory unit 14, so as to generate 6×30 sync blocks of parity information. FIG. 2 shows these (6×30=)180 parity sync blocks below the 6×277 sync blocks, and denoted ECC2. These 6×30 parity sync blocks are the parity sync blocks recorded at the end of each of the tracks, numbered SB306 to SB335.

Next, a third error correction encoding is carried out on the sync blocks in the memory unit 14. This third error correction encoding step is realized under the influence of the control block 24, denoted ECC3, in FIG. 1. The third error correction encoding step is a so-called 'horizontal' or 'inner' error correction encoding step, carried out on the 6×307 sync blocks in the memory unit 14, so as to generate 8 parity bytes in each of the sync blocks. FIG. 2 shows these 8 parity bytes in each of the sync blocks by ECC3, coupled at the end of the bit array of the bits in all those sync blocks.

Next, the memory unit 14 is read out, sync block after sync block for recording in the tracks on the record carrier. First, the sync blocks are supplied to a unit 26, in which two sync bytes and three ID bytes are added to each sync block, resulting in the complete sync blocks as shown in FIG. 10 of WO 98/34226. Further, auxiliary information, for incorporation into the sync blocks numbered 0 to 23 in the aux area 8, see FIG. 1 of document D1, is added to the datastream, as well as various preamble and post/amble portions. Next, after having carried out a channel encoding step on the sequence of complete sync blocks, the information is recorded on the record carrier, where, in each track, the last 30 sync blocks are parity sync blocks.

The 112 trick play sync blocks shown in the left hand side of FIG. 2 can be read from the memory unit 8, such that the trick play sync blocks are read from the top to the bottom in MEM1 in FIG. 2, for storage in the memory unit 14. In the end, these 112 trick play sync blocks will be stored on the record carrier such that, during trick play reproduction at the velocity corresponding to that trick play signal, they will be read during one rotation of the head drum. Reference is made in that respect to document D1. This order of reading the trick play sync blocks from the memory unit 8 is however, not a necessity. If it is convenient, because of processing reasons, to store the trick play sync blocks in another order in the memory unit 14, this is also possible, as long as the 112 trick play sync blocks discussed above will, in the end, be recorded in such trick play segments on the record carrier that they will be read during that same one rotation of the head drum in the trick play mode.

For a reverse trick play speed, the trick play sync blocks should be read from the unit 8 in a reverse order, so that they will be recorded in a reverse order on the record carrier.

Upon reproduction, the inverse processing can be carried out, resulting in a replica of the original signals: the normal play information signal during normal play reproduction mode and a trick play information signal during a trick play reproduction mode.

While the invention has been described with reference to preferred embodiments thereof, it is to be understood that these are not limitative examples. Thus, various modifications may become apparent to those skilled in the art, without departing from the scope of the invention, as defined by the claims. Further, the invention lies in each an every novel feature and combination of features.

LIST OF RELATED DOCUMENTS

International Patent Application No. WO 98/34,226, corresponding to U.S. Pat. No. 6,222,981 (PHN 16,614, A. Rijckaert)

European Patent Application No. 98201959.8, corresponding to U.S. patent application Ser. No. 09/329,394, filed Jun. 10, 1999 (PHN 16,959, O. Eerenberg et al.)

What is claimed is:

1. An apparatus for recording a digital information signal in slant tracks on a record carrier, the apparatus comprising:
   input means for receiving a digital information signal,
   first coding means for encoding the digital information signal so as to obtain sync blocks of information comprising a portion of information of the digital information signal, trick play signal receiving means for receiving a trick play signal, second coding means for encoding the trick play signal so as to obtain trick play sync blocks of information comprising a portion of the trick play signal, first error correction encoding means for carrying out an error correction encoding N trick play sync blocks of the trick play signal so as to obtain M trick play sync blocks comprising parity information, generation means for generating groups of P sync blocks, a group of P sync blocks comprising sync blocks of the digital information signal and at least some of the N+M trick play sync blocks, second error correction encoding means for carrying out a second error correction encoding step on a group of P sync blocks to form a group of P+Q sync blocks, third error correction encoding means for carrying out an error correction encoding step on each sync block in the group of P+Q sync blocks to form a group of P+Q sync blocks so as to obtain a group of P+Q error correction encoded sync blocks, writing means for writing the P+Q error correction encoded sync blocks in a plurality of R tracks on the record carrier, where M, N, P, Q and R are integers larger than 1, characterized in that an order in which the trick play sync blocks are supplied by the first error correction encoding means to the second error correction encoding means is not the same as the order in which the third error correction encoding means supplies said trick play sync blocks, after error correction encoding, to the writing means.

2. Method for recording a digital information signal in slant tracks on a record carrier, said method comprising the steps:

receiving a digital information signal;

encoding the digital informationm signal to form sync blocks of information comprising a portion of information of the digital information signal;

receiving a trick play signal;

encoding the trick play signal to form trick play sync blocks of information comprising a portion of the trick play signal;

first error correction encoding N trick play sync blocks of the trick play signal to form M trick play sync blocks comprising parity information;

generating groups of P sync blocks, each group of P sync blocks comprising sync blocks of the digital information signal and at least some of the N+M trick play sync blocks;

second error correction encoding a group of P sync blocks to form a group of P+Q sync blocks;

third error correction encoding each sync block in the group of P+Q sync blocks to form a group of P+Q error correction encoded sync blocks; and writing the P+Q error correction encoded sync blocks in a plurality R of tracks on the record carrier, where M, N, P, Q and R are intergers larger than 1, characterized in that an order in which the trick play sync blocks are supplied by the first error correction encoding step to the second error correction encoding step is not the same as an order in which the third error correction encoding step supplies said trick play sync blocks, after error correction encoding, to the writing step.

* * * * *